(12) United States Patent
Khalil et al.

(10) Patent No.: US 8,411,340 B2
(45) Date of Patent: Apr. 2, 2013

(54) ULTRA-WIDE ANGLE MEMS SCANNER ARCHITECTURE

(75) Inventors: Diaa A. Khalil, First Zone (EG); Hisham Haddara, Heliopolis Cairo (EG)

(73) Assignee: Si-Ware Systems, Cairo (EG)

( * ) Notice: Subject to any disclaimer, the term of this patent is extended or adjusted under 35 U.S.C. 154(b) by 473 days.

(21) Appl. No.: 12/761,819

(22) Filed: Apr. 16, 2010

(65) Prior Publication Data
US 2010/0265382 A1 Oct. 21, 2010

Related U.S. Application Data

(60) Provisional application No. 61/170,528, filed on Apr. 17, 2009.

(51) Int. Cl.
*G02B 26/08* (2006.01)
(52) U.S. Cl. .............. 359/198.1; 359/202.1; 359/224.1; 359/298; 356/328
(58) Field of Classification Search .............. 359/198.1, 359/200.6–200.8, 202.1, 221.2, 223.1–224.2, 359/290–291, 298, 900; 250/234–235
See application file for complete search history.

(56) References Cited

U.S. PATENT DOCUMENTS

| | | | |
|---|---|---|---|
| 4,480,169 A | 10/1984 | Macken | |
| 6,128,078 A | 10/2000 | Fateley | |
| 7,485,485 B2 | 2/2009 | Linden et al. | |
| 2004/0263938 A1 | 12/2004 | Mun | |

FOREIGN PATENT DOCUMENTS

| | | |
|---|---|---|
| EP | 1050772 A2 | 11/2000 |
| WO | 0231581 A1 | 4/2002 |
| WO | 2007075355 A1 | 7/2007 |

OTHER PUBLICATIONS

M. H. Kiang, O. Solgaard, R. S. Muller and K. Y. Lau, "Surface-Micromachined Electrostatic-Comb Driven Scanning Micromirrors for Barcode Scanners," Proc. Microelectromechanical Systems, pp. 192-197, Feb. 1996.

(Continued)

*Primary Examiner* — James Phan
(74) *Attorney, Agent, or Firm* — Garlick & Markison; Holly L. Rudnick

(57) ABSTRACT

An optical microscanner achieves wide rotation angles utilizing a curved reflector. The optical microscanner includes a moveable mirror for receiving an incident beam and reflecting the incident beam to produce a reflected beam and a Micro Electro-Mechanical System (MEMS) actuator that causes a linear displacement of the moveable mirror. The curved reflector produces an angular rotation of the reflected beam based on the linear displacement of the moveable mirror.

20 Claims, 9 Drawing Sheets

OTHER PUBLICATIONS

A. D. Yalcinkaya, H. Urey and S. Holmstrom, "NiFe Plated Biaxial MEMS Scanner for 2-D Imaging," IEEE Photonics Technology Letters, vol. 19, No. 5, pp. 330-332, Mar. 1, 2007.

A. D. Aguirre, P. R. Herz, Y. Chen and J. G. Fujimoto, "Two-axis MEMS Scanning Catheter for Ultrahigh Resolution Three-dimensional and En Face Imaging," Optics Express, vol. 15, No. 5, pp. 2445-2453, Mar. 5, 2007.

H. Miyajima, K. Murakami and M. Katashiro, "MEMS Optical Scanners for Microscopes," IEEE Journal of Selected Topics in Quantum Electronics, vol. 10, No. 3, pp. 514-527, May/Jun. 2004.

K. E. Petersen, "Silicon Torsional Scanning Mirror," IBM J. Res. Develop, vol. 24, No. 5, pp. 631-637, Sep. 1980.

S. Kwon, V. Milanovic, and L. P. Lee, "Large-Displacement Vertical Microlens Scanner with Low Driving Voltage," IEEE Photonics Technology Letters, vol. 14, No. 11, pp. 1572-1574, Nov. 2002.

H. Urey, S. Holmstrom and A. D. Yalcinkaya, "Electromagnetically Actuated FR4 Scanners," IEEE Photonics Technology Letters, vol. 20, No. 1, pp. 30-32, Jan. 1, 2008.

J. Tsai, S. Chiou, T. Hsieh, C. Sun, D. Hah and M. C. Wu, "Two-axis MEMS Scanners with Radial Vertical Combdrive Actuators—Design, Theoretical Analysis, and Fabrication", Journal of Optics A: Pure and Applied Optics, Oct. 2008.

International Search Report and Written Opinion of the International Searching Authority for PCT/US2010/031416 mailed Sep. 21, 2010.

Partial International Search of the International Searching Authority for PCT/US2010/031416 mailed Jul. 12, 2010.

ULTRA-WIDE ANGLE MEMS SCANNER ARCHITECTURE

CROSS REFERENCE TO RELATED PATENTS

This U.S. application for patent claims the benefit of the filing date of U.S. Provisional Patent Application entitled, Ultra Wide Angle MEMS Scanner Architecture, having Ser. No. 61/170,528, filed on Apr. 17, 2009, which is incorporated herein by reference for all purposes.

BACKGROUND OF THE INVENTION

1. Technical Field of the Invention

The present invention relates in general to optical MEMS, and in particular, to optical scanner architectures using MEME.

2. Description of Related Art

Micro Electro-Mechanical Systems (MEMS) refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. MEMS devices are attractive candidates for use in spectroscopy, profilometry, environmental sensing, refractive index measurements (or material recognition), as well as several other sensor applications, due to their low cost, batch processing ability and compatibility with standard microelectronics. In addition, the small size of MEMS devices enables the integration of equipment incorporating MEMS devices into mobile and hand held devices.

Moreover, MEMS technology, with its numerous actuation techniques, enables the realization of new functions and features of photonic devices, such as optical tunability and dynamic sensing applications. Optical scanners are important elements for many industrial applications such as bar code readers, laser scanning in free space, optical communication and surveillance, laser radar, optical coherence tomography and imaging. The fabrication of optical scanners using MEMS technology allows their use in new and innovative applications, such as endoscopes, optical microscopes and various applications that require portability and mobility. In additional to the intrinsic advantages offered by the MEMS technology, such as small size, low fabrication cost due to batch processing and low power consumption, MEMS microscanners can also be easily integrated in a complete system, even with a laser source in the same package.

Therefore, intensive industrial and academic research has been oriented in the last decade towards the fabrication of 1-D and 2-D optical microscanners using MEMS technology. The bulk of this research has been based on the use of rotating micromirrors, where the mirror is built in either the substrate plane using surface micromaching technology or in the plane normal to the substrate using DRIE (Deep Reactive Ion Etching) in SOI technology. Different actuation forces have also been suggested, such as utilizing electrothermal force through structure bending or electrostatic force through a comb drive actuator.

Researchers are now focusing their attention on producing a micromirror with a wide rotation angle. However, except when using special materials, such as polyamides or magnetic materials that are not common in microelectronics technology, where the rotation angles can achieve wide values (i.e., 45 or 50 degrees), most of the structures based on rotating mirrors are limited to rotation angles in the order of ±10 degrees.

SUMMARY OF THE INVENTION

Embodiments of the present invention provide an optical microscanner capable of achieving wide rotation angles. In one embodiment, the optical microscanner includes a moveable mirror optically coupled to receive an incident beam and operable to reflect the incident beam to produce a reflected beam, a Micro Electro-Mechanical System (MEMS) actuator coupled to the moveable mirror to cause a linear displacement of the moveable mirror and a curved reflector operable to produce an angular rotation of the reflected beam based on the linear displacement of the moveable mirror.

In an exemplary embodiment, the moveable mirror is the curved reflector. In this embodiment, the curved reflector is moveable in a linear motion to cause the incident beam to experience a different angle of incidence for each position of the curved reflector.

In another exemplary embodiment, the curved reflector is optically coupled to receive the reflected beam reflected from the moveable mirror and operable to reflect the reflected beam to produce a second reflected beam. In this embodiment, the linear displacement of the moveable mirror produces a lateral displacement of the reflected beam incident on the curved reflector, and the curved reflector transforms the lateral displacement of the reflected beam into an angular rotation of the second reflected beam.

In a further exemplary embodiment, the optical microscanner is an imaging device, and the incident beam includes light from an object to be imaged that is incident on the curved reflector. In this embodiment, the curved reflector reflects the incident beam towards the moveable mirror and a detector receives the reflected beam from the moveable mirror and measures a pixel of an image of the object. The linear displacement of the moveable mirror operates to project one pixel at a time onto the detector to produce a sequential data stream representing the image.

In yet another exemplary embodiment, the optical microscanner is a dispersive element spectrometer that includes a diffraction grating optically coupled to receive the incident beam and diffract the incident beam to produce a plurality of incident beams directed towards different positions on the curved reflector, in which each of the plurality of incident beams has a different wavelength range. The spectrometer further includes a detector optically coupled to receive the reflected beam corresponding to one of the plurality of incident beams from the moveable mirror, in which the linear displacement of the moveable mirror operates to reflect one of the plurality of incident beams at a time onto the detector to produce a sequential data stream.

In still another exemplary embodiment, the optical scanner is a two-dimensional scanner. In this embodiment, the moveable mirror includes a first moveable mirror moveable in a first plane and a second moveable mirror moveable in a second plane orthogonal to the first plane. The first moveable mirror is optically coupled to receive the incident beam and operable to reflect the incident beam towards the second moveable mirror to produce a first reflected beam and the second moveable mirror is optically coupled to receive the first reflected beam and operable to reflect the first reflected beam towards the curved reflector to produce a second reflected beam. In addition, the curved reflector is optically coupled to receive the second reflected beam and operable to reflect the second reflected beam to produce a third reflected beam having an angular displacement in the first and second planes produced as a result of the respective linear displacements of the first and second moveable mirrors. The two-dimensional optical scanner may be utilized, for example, within a two-dimensional imaging device.

Embodiments of the present invention also provide a method for fabricating an optical microscanner. The method includes providing a silicon on insulator (SOI) wafer including a top surface and a bottom surface and photolithographically defining within the top surface of the SOI wafer a moveable mirror optically coupled to receive an incident beam and operable to reflect the incident beam to produce a reflected beam, a Micro Electro-Mechanical System (MEMS) actuator coupled to the moveable mirror to cause a linear displacement of the moveable mirror and a curved reflector operable to produce an angular rotation of the reflected beam based on the linear displacement of the moveable mirror. The method further includes etching between the top surface of the SOI wafer and the bottom surface of the SOI wafer to release the moveable mirror and the actuator.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

An optical microscanner in accordance with embodiments of the present invention provides an ultra wide angle that can approach 180 degrees or more. A geometrical structure is used to transform the straight line motion into optical beam rotation in space using a curved reflector. This structure allows increasing dramatically the scanning angle of microscanners to achieve a nearly complete rotation of 180 degrees or more in space. The optical microscanner of the present invention could be used in any application that requires microscanning, such as bar code readers, laser projection systems, optical scanners, 2-D and 3-D optical coherence tomography as well as imaging applications, including Infra Red (IR) and Ultra Violet (UV) or X ray imaging.

Figure 1:
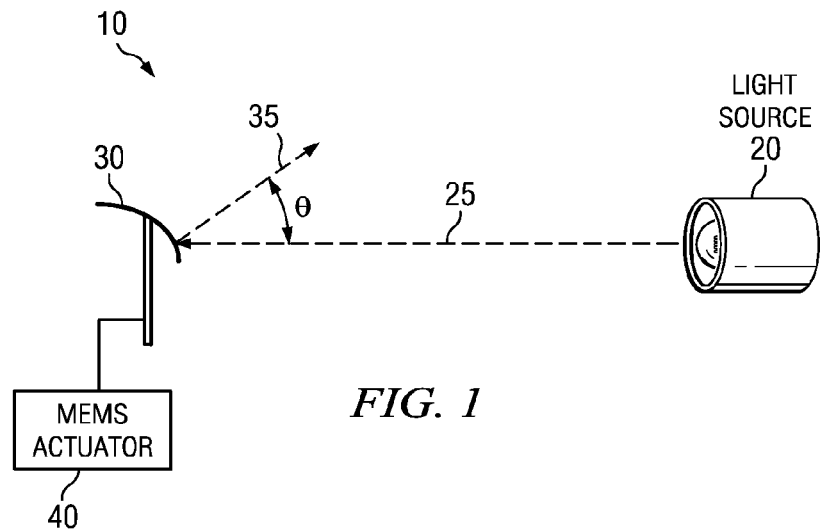
FIG. 1 is a diagram illustrating an exemplary operation of an optical microscanner in accordance with embodiments of the present invention.

Turning now to FIG. 1, there is illustrated an exemplary optical microscanner in accordance with embodiments of the present invention. The optical microscanner 10 can be fabricated using, for example, conventional MEMS technology with one lithography step and classical metallization, as described in more detail below in connection with FIGS. 9A-9J.

The optical microscanner 10 includes a light source 20, a curved reflector 30 and a Micro Electro-Mechanical Systems (MEMS) actuator 40. The light source 20 may be, for example, a laser source, a collimated LED, an optical fiber, or any other type of optical source. The light source 20 may produce visible, Infra Red (IR), Ultra Violet (UV), X-ray or Microwave radiation. The MEMS actuator 40 may be an electrostatic comb-drive actuator or other type of MEMS actuator. The curved reflector 30 may be a mirror or other type of reflecting surface. The curved reflector 30 shown in FIG. 1 has a convex shape. However, in other embodiments, the curved reflector 30 may have a concave shape.

The curved reflector 30 is optically coupled to receive an incident beam 25 from the light source 20 and to reflect the incident beam 25 to produce a reflected beam 35. The MEMS actuator 40 causes a linear or curvilinear displacement of the curved reflector 30. The curved reflector 30 transforms the linear or curvilinear displacement into an angular rotation θ in space. Depending on the position of the curved reflector 30 with respect to the light source 20, the incident beam 25 experiences a different angle of incidence, and therefore, the reflected beam 35 experiences a different angle of reflectance. This enables the optical microscanner 10 to produce a scanning beam with a wide optical rotating angle that can approach 180 degrees.

Figure 2:
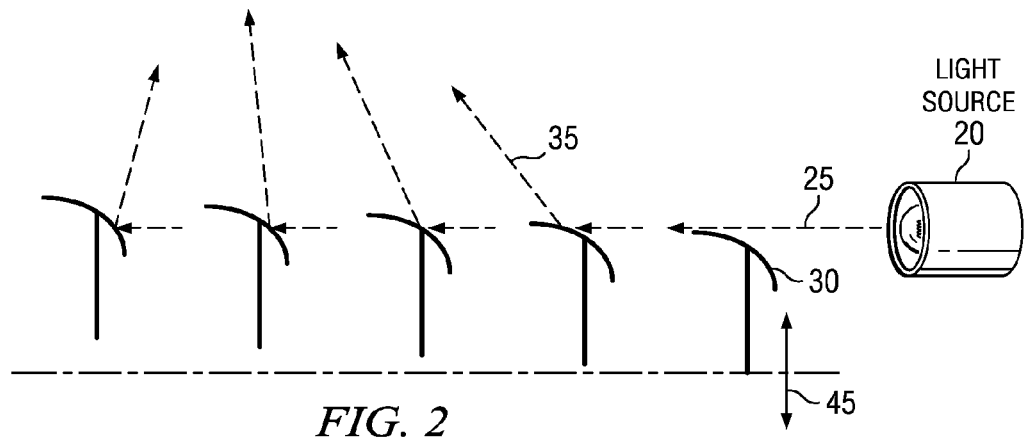
FIG. 2 illustrates the wide angular rotation achieved by the optical microscanner of FIG. 1 in accordance with embodiments of the present invention.

For example, as shown in FIG. 2, as the curved reflector 30 is displaced 45 orthogonal to the direction of the incident beam 25, while the light source 20 remains fixed, the curved reflector 30 produces a reflected beam 35 having different angles of reflection. Therefore, the linear displacement 45 of the curved reflector is transformed into a nearly 180 degree rotation in space of the reflected beam 35.

Figure 3A:
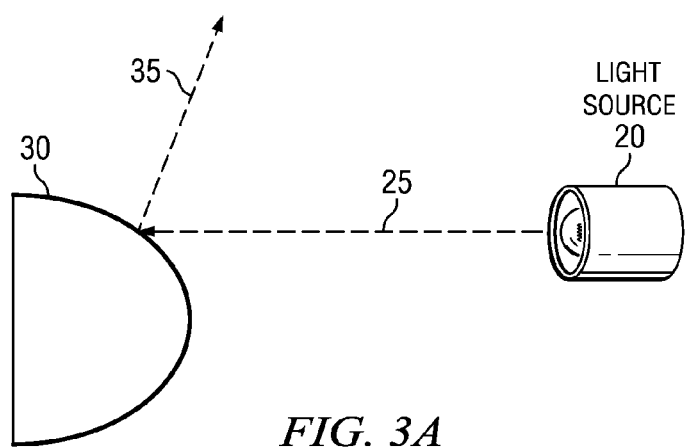
FIGS. 3A and 3B are diagrams illustrating an exemplary optical microscanner capable of achieving a 360 degree angular rotation in accordance with embodiments of the present invention.
Figure 3B:
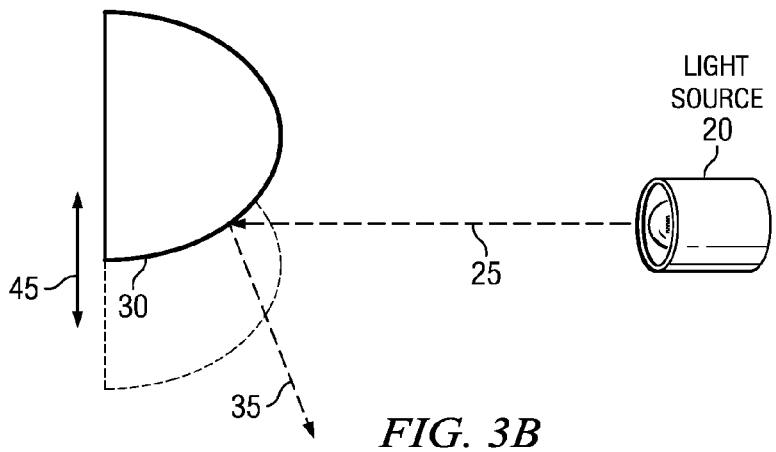

Turning now to FIGS. 3A and 3B, the shape of the curved reflector 30 can be designed such that the linear motion of the curved reflector 30 results in a complete 360 degree beam rotation in space. As shown in FIGS. 3A and 3B, the curved reflector 30 has a partial spheroid or spherical shape that enables the incident beam 25 from the light source 20 to impinge on both an upper surface and a lower surface of the curved reflector 30 as the curved reflector 30 is linearly displaced 45 in a direction orthogonal to the incident beam 25. However, in this embodiment, part of the scanning angle may be masked by the light source 20.

Figure 4A:
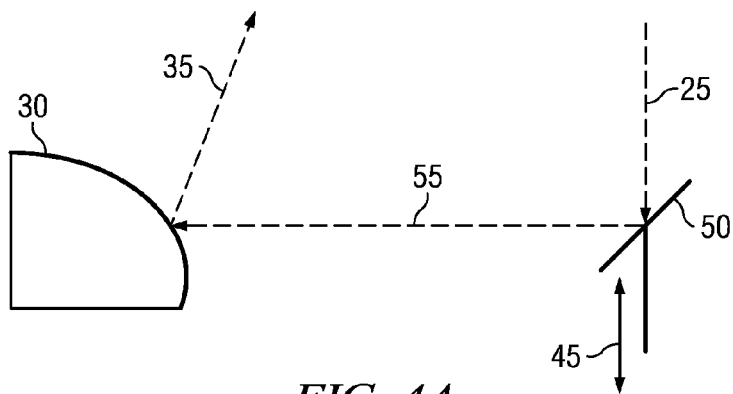
FIGS. 4A and 4B are pictorial diagrams illustrating another exemplary microscanner in accordance with embodiments of the present invention.
Figure 4B:
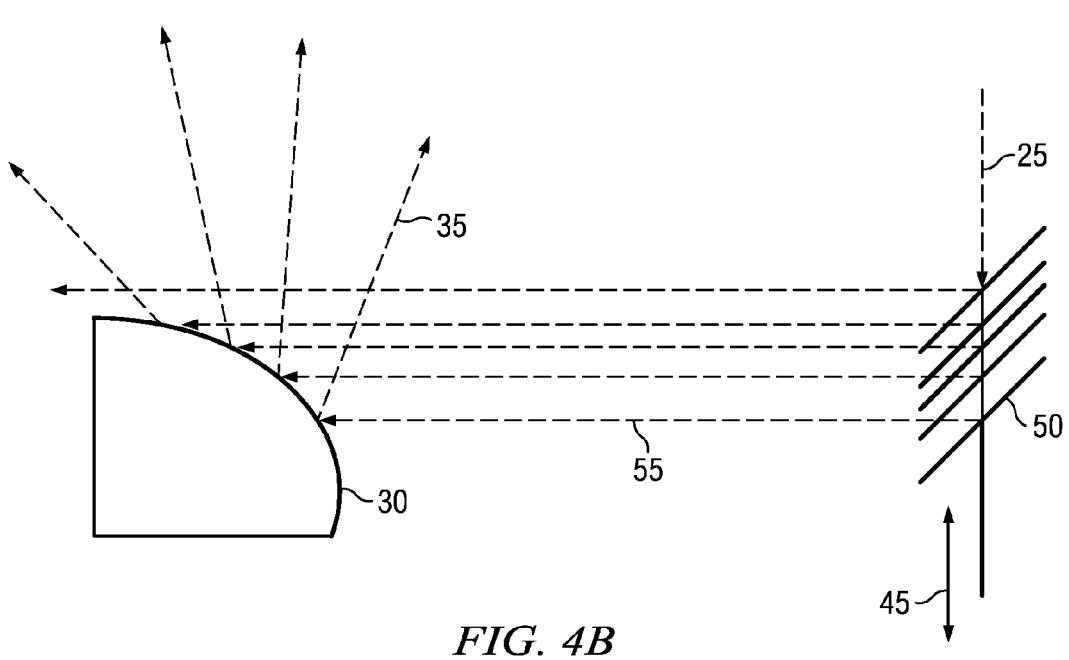

FIGS. 4A and 4B illustrate another exemplary optical microscanner in accordance with embodiments of the present invention. In FIGS. 4A and 4B, instead of using the MEMS actuator (shown in FIG. 1) to displace the curved reflector 30, the MEMS actuator operates to cause a linear displacement of a mirror 50. The mirror 50 may have a suitable angle (e.g., 45 degrees or any other angle) with respect to the mirror motion direction 45 or the optical incident beam 25, such that the linear or curvilinear mirror motion 45 results in beam lateral displacement. The lateral beam displacement is then transformed to beam rotation when reflected from the curved reflector 30, since each position of the mirror 50 directs the beam to a part of the curved reflector with a different slope. The angled mirror 50 could be a flat mirror or a curved mirror to compensate for the possible beam deformation due to the curvature of the curved reflector 30.

In an exemplary operation, the moving mirror 50 is optically coupled to receive the incident beam 25 and reflects the incident beam 25 to produce a reflected beam 55 directed towards a point on the fixed curved reflector 30, depending on the position of the moving mirror. The curved reflector 30 again reflects the reflected beam 55 to produce a second reflected beam 35 having an angular rotation in space based on the motion of the moving mirror 50.

Figure 5A:
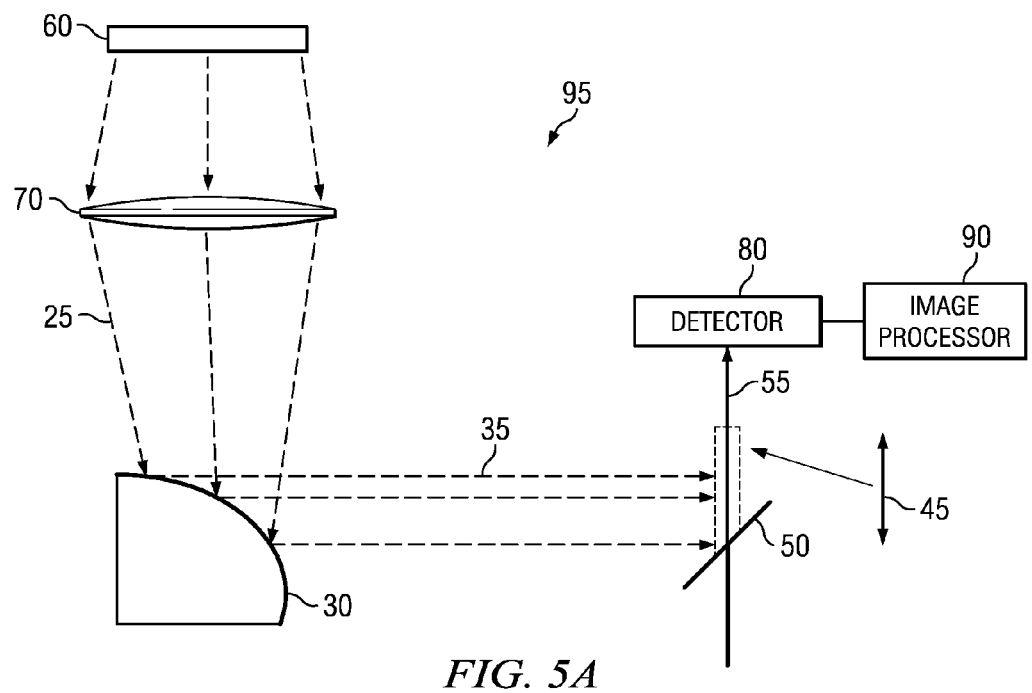
FIGS. 5A-5C are diagrams illustrating an exemplary imaging device implementing an exemplary wide angle optical microscanner in accordance with embodiments of the present invention.

The optical microscanner can also be used in the inverse direction to image a picture or an array of points, as shown in FIG. 5A. In this embodiment, the optical microscanner is implemented within an imaging device 95 that includes a projection lens 70, the curved reflector 30, the moving mirror 50, a detector 80 and an image processor 90. The detector 80 may be, for example, any type of photosensor or photodetector capable of sensing or measuring the intensity of light or other electromagnetic energy. The image processor 90 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The image processor 90 may have an associated memory and/or memory element, which may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

In an exemplary operation, light reflected/scattered from an object 60 to be imaged is focused through a projection lens 70 and incident 25 on the curved reflector 30. The curved reflector reflects the incident beams 25 to produce reflected beams 35 that collectively form an image in the space in front of the moving angled mirror 50. The angled mirror motion 45 allows one pixel at a time to be projected onto the detector 80 as reflected beams 55 to transform the image into a sequential data stream provided to the image processor 90. The image processor 90 reconstructs the image of the object 60 from the sequential data stream. The curved reflector 30 may be used to collect the image from a wide angle of view or a small linear part to be scanned by the moving angled mirror 50. Since only a single detector 80, and not an array of detectors, is necessary to capture the entire image of the object 60, the cost of the imaging device 95 shown in FIG. 5A is significantly reduced compared to imaging devices utilizing detector arrays.

Figure 5B:
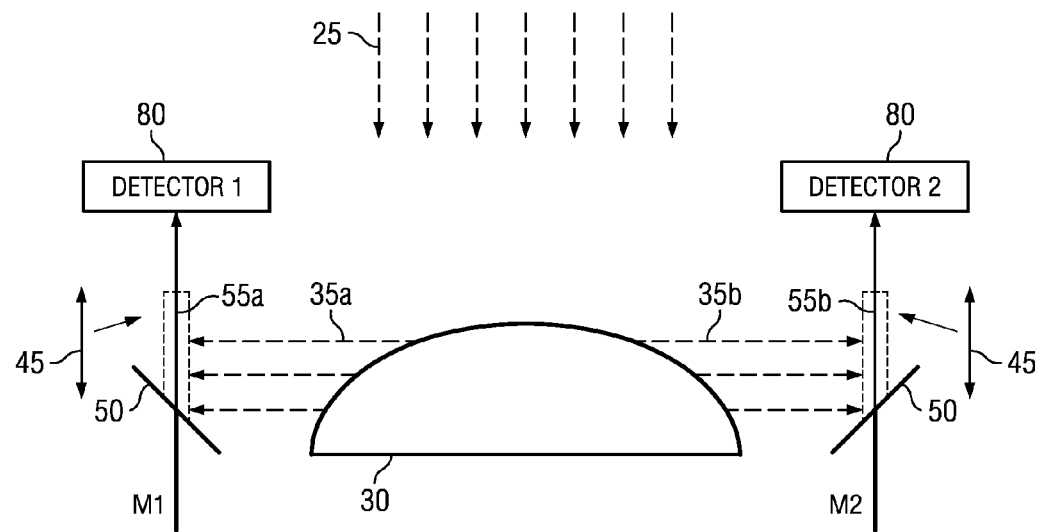
Figure 5C:
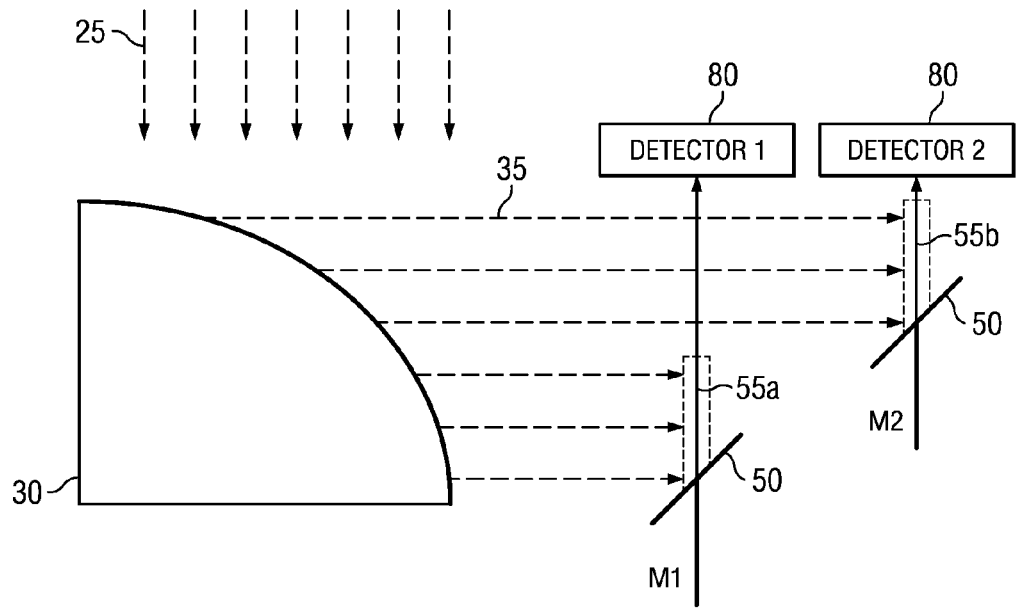

As shown in FIGS. 5B and 5C, if the mirror travel range is short and not sufficient to cover the entire image width, more than one moving mirror M1 and M2 with respective detectors D1 and D2 can be used to scan the image. In this embodiment, the image may be reflected either on two sides of the curved reflector 30, as shown in FIG. 5B, or on one side of the curved reflector with a long range that could be covered sequentially by the different moving mirrors, as shown in FIG. 5C. The image processor 90 can reconstruct the image from two sequential data streams by adjusting the required synchronization between the different portions of the image.

For example, in an exemplary operation of the imaging device shown in FIG. 5B, incident beams 25 are reflected by the curved reflector 30 as reflected beams 35a and 35b towards one of M1 or M2, respectively, depending on the position on the curved reflector 30 and the angle of incidence of the incident beam 25. Each of the angled mirrors M1 and M2 reflects the reflected beams 35a and 35b towards respective detectors D1 and D2 as second reflected beams 55a and 55b. The angled mirror motion 45 of each angled mirror M1 and M2 allows one pixel at a time to be projected onto detectors D1 and D2. Detectors D1 and D2 each produce respective sequential data streams that are provided to an image processor (shown in FIG. 5A) for combination and reconstruction of the image.

In an exemplary operation of the imaging device shown in FIG. 5C, incident beams 25 are reflected by the curved reflector 30 as reflected beams 35. Depending on the position on curved reflector 30 and the angle of incidence, the reflected beams are directed towards one of M1 or M2. M1 and M2 have substantially non-overlapping ranges of linear motion such that the reflected beams 35 may be received by only one of the angled mirrors M1 and M2. Each of the angled mirrors M1 and M2 reflects the reflected beams 35 towards respective detectors D1 and D2 as second reflected beams 55a and 55b. The angled mirror motion 45 of each angled mirror M1 and M2 allows one pixel at a time to be projected onto detectors D1 and D2. Detectors D1 and D2 each produce respective sequential data streams that are provided to an image processor (shown in FIG. 5A) for combination and reconstruction of the image.

Although not shown, in another embodiment, only a single detector may be provided with two moving mirrors if the different scanned potions of the image are reflected by different curved reflectors onto the single detector. For example, the detector can be the focal point of a parabolic surface representing the curved reflector.

In general, the angled moving mirror of the optical microscanner of the present invention enables an array of detectors to be replaced by a single detector in any application. Moreover, the curved reflector in combination with the angled moving mirror of the optical microscanner of the present invention enables an array of detectors collecting light from different directions to be replaced with a single detector.

Figure 6A:
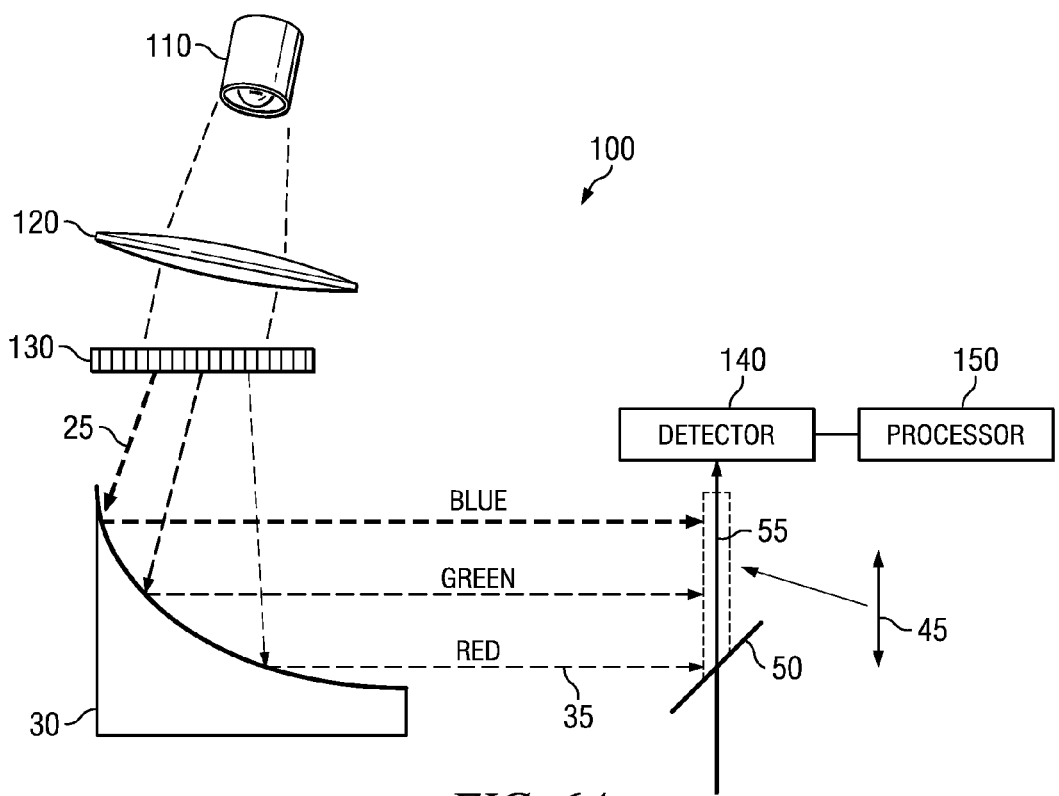
FIGS. 6A and 6B are diagrams illustrating an exemplary dispersive element spectrometer implementing an exemplary wide angle optical microscanner in accordance with embodiments of the present invention.
Figure 6B:
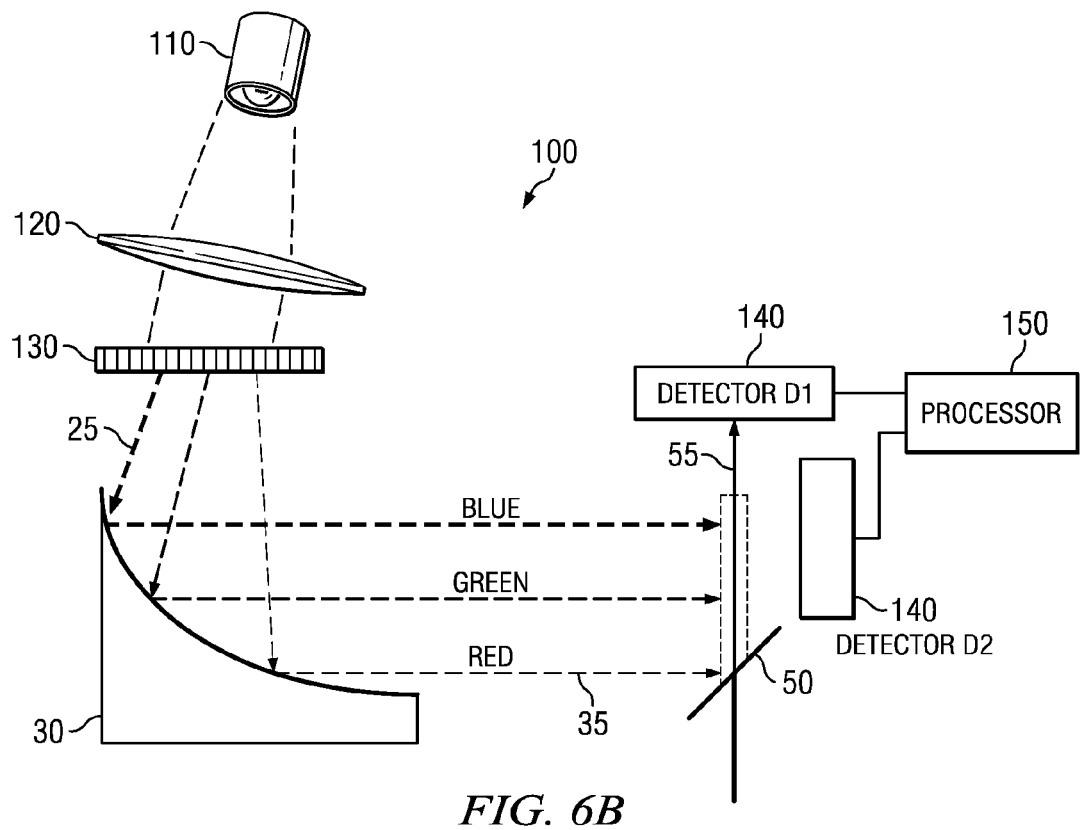

Turning now to FIGS. 6A and 6B, another application where the optical microscanner of the present invention may enable an array of detectors to be replaced by a single detector is in a dispersive element spectrometer 100. As can be seen in FIG. 6A, the spectrometer 100 includes a light source 100, projection lens 120, diffraction grating 130, curved reflector 30, moving angled mirror 50, detector 140 and processor 150. The light source 20 may be, for example, a laser source, a collimated LED, an optical fiber, or any other type of optical source. The light source 20 may produce visible (as shown), Infra Red (IR), Ultra Violet (UV), X-ray or Microwave radiation. The diffraction grating 130 is an optical component that splits and diffracts light into several beams travelling in different directions. The directions of these beams depend on the spacing of the grating and the wavelength of the light, so that the grating acts as the dispersive element. Although a transmission grating 130 is illustrated in FIG. 6A, in other embodiments a reflecting grating may be used.

The detector 140 may be, for example, any type of photosensor or photodetector capable of sensing or measuring the intensity of light or other electromagnetic energy. The processor 150 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processor 150 may have an associated memory and/or memory element, which may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

In an exemplary operation, light from source 100 is projected via projection lens 120 onto the diffraction grating 130. The diffraction grating 130 is designed such that each color/wavelength is directed to a different position as incident beams 25 on the curved reflector 30. Although the curved reflector 30 is shown in FIG. 6A as having a concave shape, in other embodiments, the curved reflector 30 may have a convex shape. The curved reflector 30 reflects each color/wavelength as respective reflected beams 35 towards the moving angled mirror 50. The angled mirror motion 45 enables the reflected light 35 to be scanned so that the angled mirror 50 reflects one color/wavelength 55 at a time onto the single detector 140. The processor 150 receives a sequential data stream from the detector 140, and with knowledge of the position of the angled mirror 50 at each measurement by the detector 140, the processor can determine the intensity of each color/wavelength of interest.

In IR and UV spectrometers, the price of the detector array may be high, and therefore, since implementing the optical microscanner of the present invention within such spectrometers allows the use of one single detector, this can greatly decrease the cost of IR and UV spectrometers. The optical microscanner of the present invention also allows the improvement of the resolution without any additional cost by simply controlling the mirror 50 position and size. For example, a small width mirror 50 may be employed, such that the reflecting mirror size determines the spectral resolution. In this embodiment, the mirror size may be equivalent to the size of the slit (opening) in the diffraction grating 130 or the pixel size of the detector 140.

As another example, a wide moving mirror 50 may be employed, such that at a certain mirror position x determined by the position of the mirror edge in space, the total power from −ve infinity to x is reflected into the detector 140. In this embodiment, the power measured by the detector 140 is given by:

$$P(x) = \int_{-\infty}^{x} F(x)dx, \quad \text{(Equation 1)}$$

where F(x) is the power distribution in the x direction on the line covered by the mirror in its trajectory, which is also the spectral distribution in the space created by the dispersive element as the coordinate x represents the wavelength (or the optical frequency). The knowledge of F(x) is the objective of the spectrometer measurement. In order to get F(x) from P(x), the processor 150 can apply simple differentiation with respect to x, i.e.

$$F(x) = \frac{\partial P(x)}{\partial x}. \quad \text{(Equation 2)}$$

Thus, measuring P(x) and performing differentiation with respect to x produces the function F(x), i.e., the spectrum. In this embodiment, the resolution of F(x) determination is not dependant on the mirror size, but rather on the minimum mirror step motion in the x direction. Since the minimum mirror step motion is only limited by the electronic driver circuitry, a high resolution can be achieved by simply reducing the mirror step motion. In another embodiment, the resolution could also be adjustable by the software.

However, the power measured by the detector 140 in this configuration is much higher than the power measured in the small mirror configuration, which greatly increases the signal to noise ratio of the spectrometer due to an effect similar to the multiplexing effect in FTIR spectrometers. Therefore, in another embodiment, this configuration can also be implemented using two detectors D1 and D2, as shown in FIG. 6B. In FIG. 6B, the two detectors D1 and D2 are complementary, and therefore:

$$P_1(x) = \int_{-\infty}^{x} F(x)dx, \quad \text{(Equation 3)}$$

while $$P_2(x) = \int_{x}^{\infty} F(x)dx. \quad \text{(Equation 4)}$$

Therefore, $$F(x) = \frac{\partial P_1(x)}{\partial x} = -\frac{\partial P_2(x)}{\partial x}. \quad \text{(Equation 5)}$$

As a result, a differential output is produced towards the processor 150 for the spectrum, which allows (by simple subtraction in the processor 150) the elimination of at least part of the noise associated with the signal and the elimination of the effect of any fluctuations in the optical source 110. In addition, the detector collected power as a function of the mirror position allows, by differentiation, the intensity distribution as a function of the mirror edge position to be obtained.

Figure 7A:
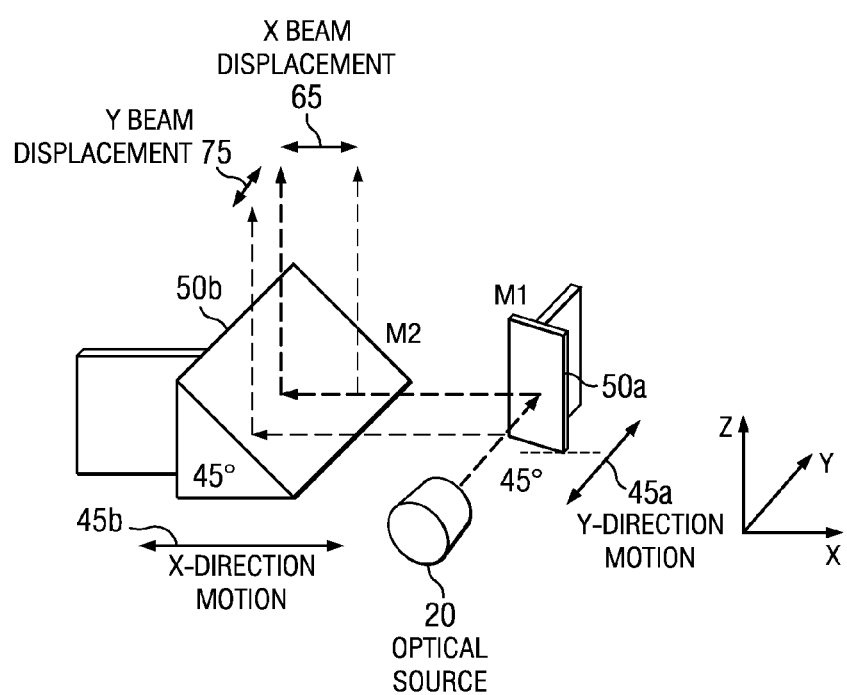
FIGS. 7A and 7B are diagrams illustrating an exemplary two-dimensional optical microscanner in accordance with embodiments of the present invention.

The optical microscanner of the present invention can also be extended to two dimensional scanning. FIG. 7A illustrates a schematic diagram of a 2-D scanner using two mirrors 50a (M1) and 50b (M2) with perpendicular motion paths. In FIG. 7A, scanning is performed in the XY plane. For this to be achieved, one of the two mirrors (M1) has an angle of 45 degrees with the XZ plane and the other mirror (M2) has an angle of 45 degrees with the XY plane, with the input optical source 20 emitting light in the −ve Y direction. Therefore, the light beam is emitted from the source 20 to M1, to M2, and then to an area above the optical microscanner in the XY domain. The X position 45b of the beam can be controlled by moving mirror M2, while its Y position 45a is controlled by the mirror M1 position. Moving M1 and M2 distances L1 and L2, respectively, results in a complete scanning of an area of dimensions L1×L2.

Figure 7B:
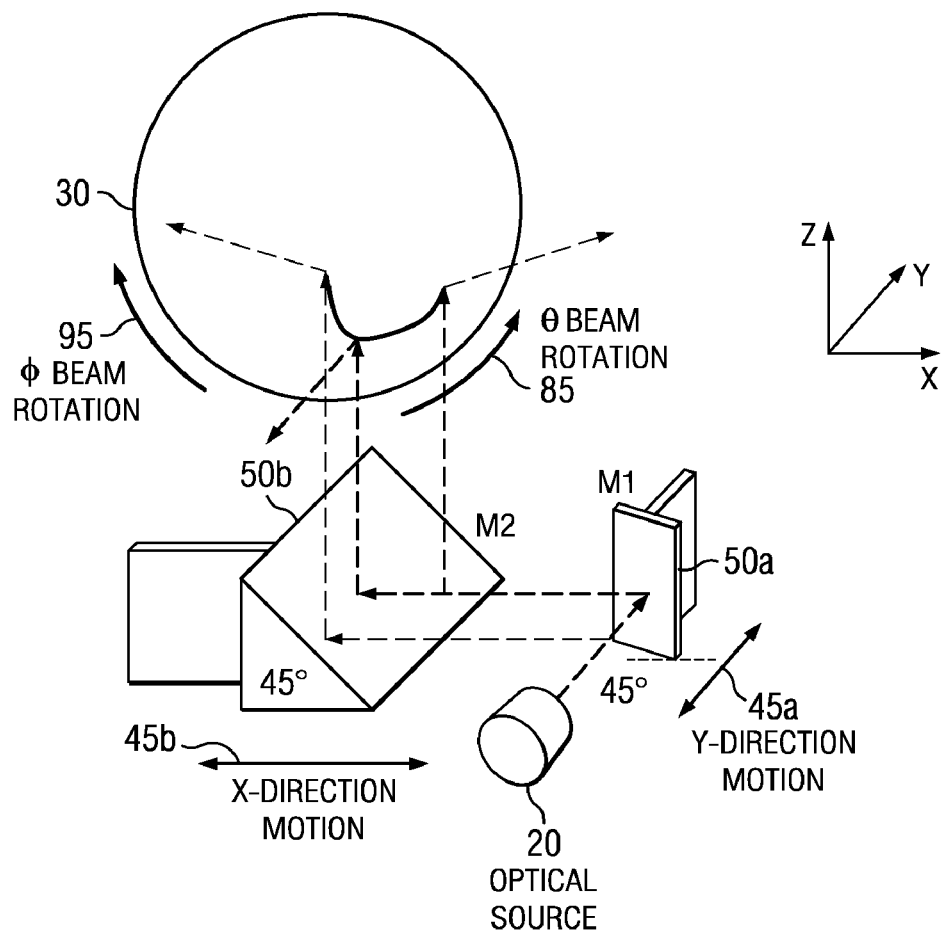

Turning now to FIG. 7B, in an exemplary embodiment, M2 has a long reflecting surface of length equal at least to the travel range of the mirror M1. The covered area can then be transformed to a wide angular scanning in the space by again using a curved reflector 30 that transforms the X displacement to a θ beam rotation 85 and the Y displacement to a □ beam rotation 95. Although the curved reflector 30 is shown as a sphere, the curved reflector 30 may be any 3-D reflector, such as a paraboloid or an ellipsoid. According to the equation describing the surface used, an algorithm can be ascertained that determines the relation between the angles θ, □ in the space and the displacements X and Y in the corresponding plane (area). In addition, a complete sphere is not required, as only a quarter (or any part) of the sphere could be sufficient, depending on the range of angles to be covered. In other embodiments, a cylinder may be used instead of the sphere, but in this embodiment, the scanning may cover a wide angle in one plane and then to move a step, dx, and repeat the scanning on the same angular range in another parallel plane and so on, i.e., the scanning is angular in one plane and linear in the direction perpendicular to this plane.

The above-described 2-D scanning technique with two moving mirrors M1 and M2 may also be used in imaging applications. In this embodiment, the image projected onto a small area (L1×L2) may be scanned using the two moving mirrors M1 and M2 and then recovered as a sequential series of data collected with one detector. Replacing an array of detectors with only one detector and two moving mirrors can significantly reduce the cost in many imaging devices, such as IR imaging devices. The equivalent pixel size in such an imaging device can be determined by the data acquisition system (imaging processor) behind the detector, as well as the speed of mirror motion and detector area (or entrance pupil).

Figure 8:
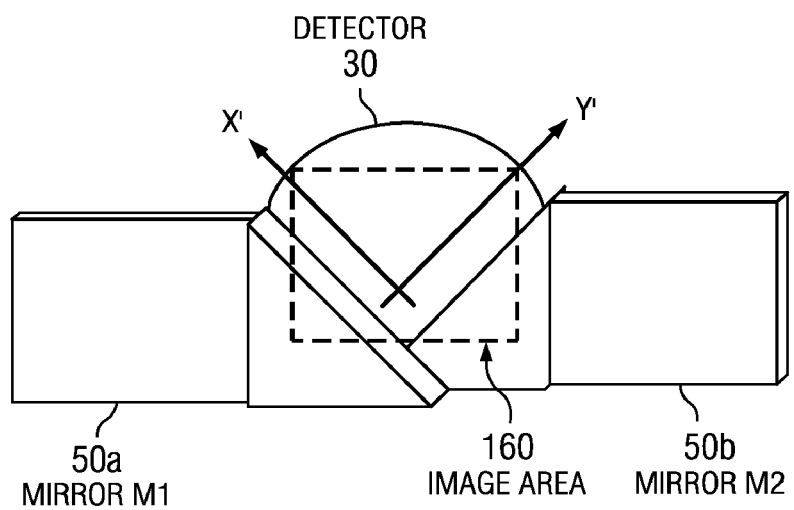
FIG. 8 is a diagram illustrating an exemplary two-dimensional imaging device implementing an exemplary wide angle optical microscanner in accordance with embodiments of the present invention.

For example, turning now to FIG. 8, there is illustrated an exemplary two-dimensional imaging device implementing an exemplary wide angle optical microscanner in accordance with embodiments of the present invention. In FIG. 8, two diagonal mirrors 50a (M1) and 50b (M2) are moving in opposite directions. The edges of the two mirrors M1 and M2 thus represent the two axis X and Y or the two dimensions of the image to be scanned. A complete scan can be achieved by moving one mirror, i.e. M1, a step, dx, in the X direction, and while it is in its position, the second mirror M2 performs a complete scan of an image line. This can be repeated for each X position until the entire image area 160 is measured by the detector 30. Then by differentiation, the final image can be obtained.

Figure 9A:
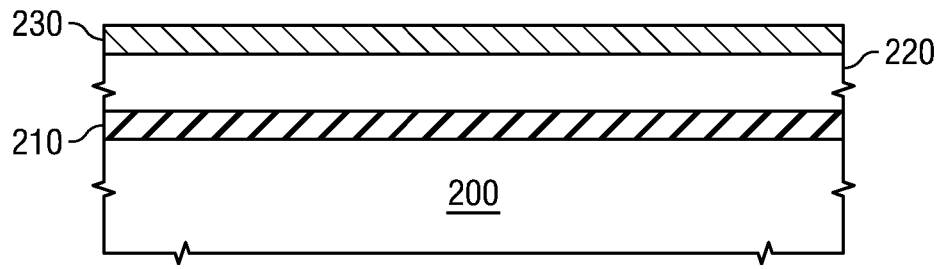
FIGS. 9A-9J illustrate exemplary fabrication process steps for fabricating a wide angle optical microscanner in accordance with embodiments of the present invention.
Figure 9B:
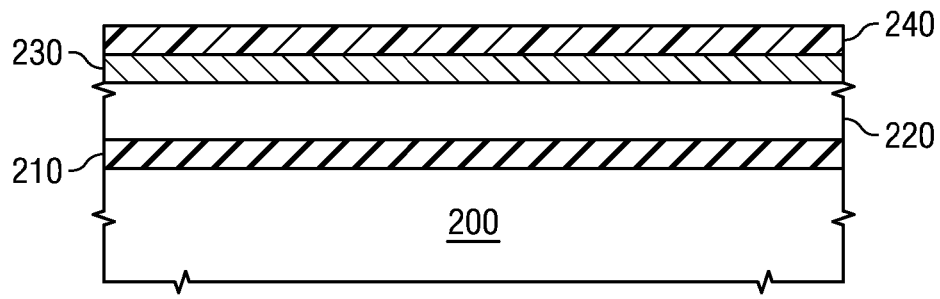
Figure 9C:
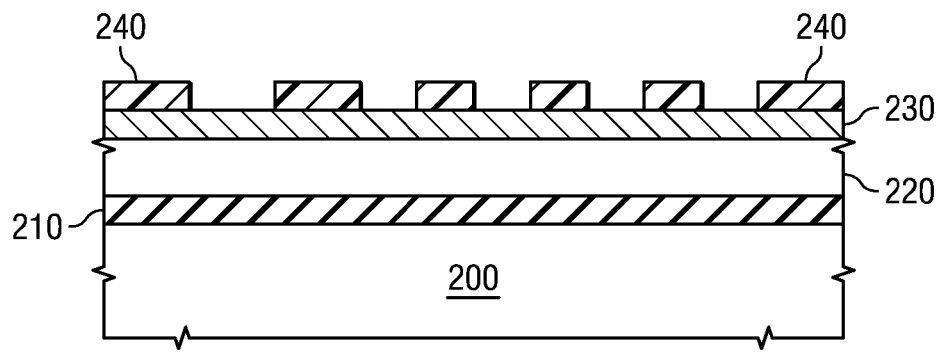
Figure 9D:
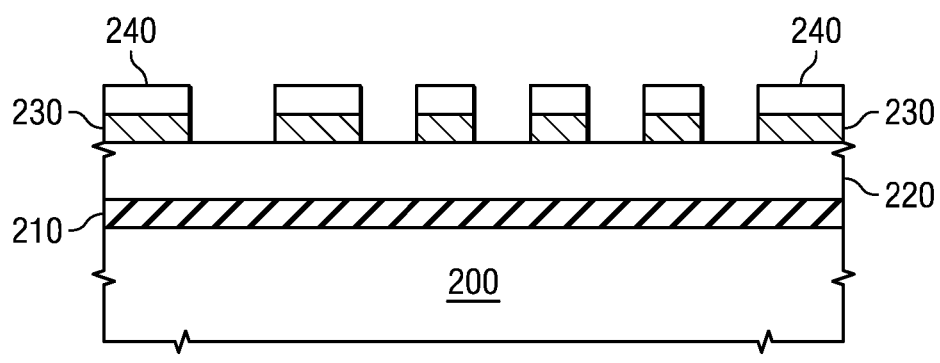
Figure 9E:
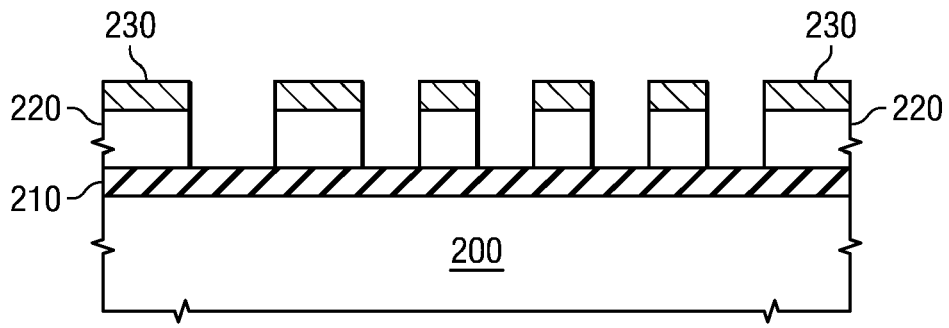
Figure 9F:
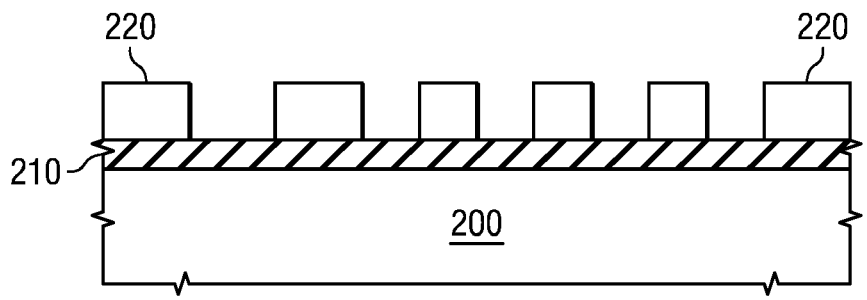

The above mentioned structures can all be fabricated using Micro-Electro-Mechanical System (MEMS) technology. Exemplary fabrication process steps for fabricating a wide angle optical microscanner in accordance with embodiments of the present invention are shown in FIGS. 9A-9J. In FIG. 9A, an aluminum sputtering step is performed over an SOI wafer (layers 200-220) to form an aluminum layer 230, which functions as a mask for a subsequent etching of the top silicon layer 220 of the SOI wafer using DRIE, as shown in FIG. 9E. In FIG. 9B, a photo-resist material 240 is spun over the aluminum layer. In FIG. 9C, a lithography step is performed for realizing the microscanner. The lithography pattern in the photo-resist material 240 is transferred to the aluminum mask 230 by plasma chlorine etching of the aluminum layer, as shown in FIG. 9D. DRIE is then applied to the wafer until reaching the oxide etch stop layer 210 of the SOI, as shown in FIG. 9E. Then, as shown in FIG. 9F, the remaining aluminum mask 230 is removed using an Alu etch.

Figure 9G:
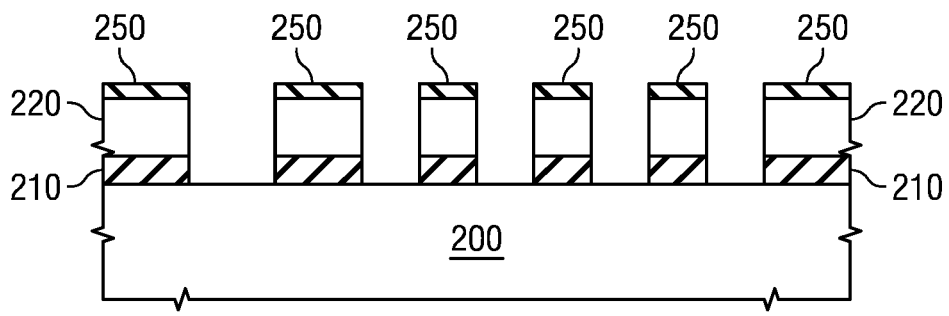
Figure 9H:
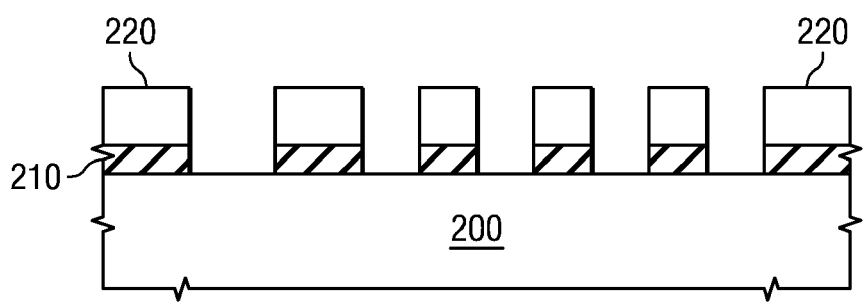
Figure 9I:
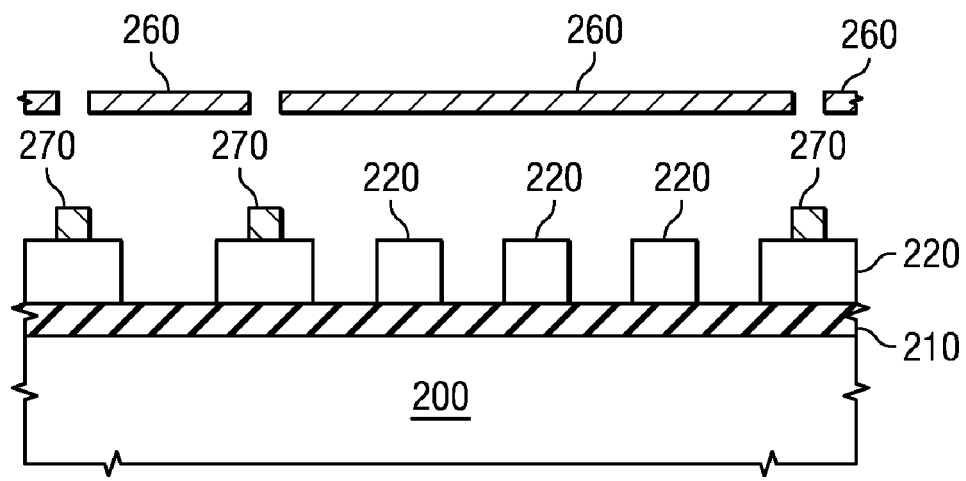
Figure 9J:
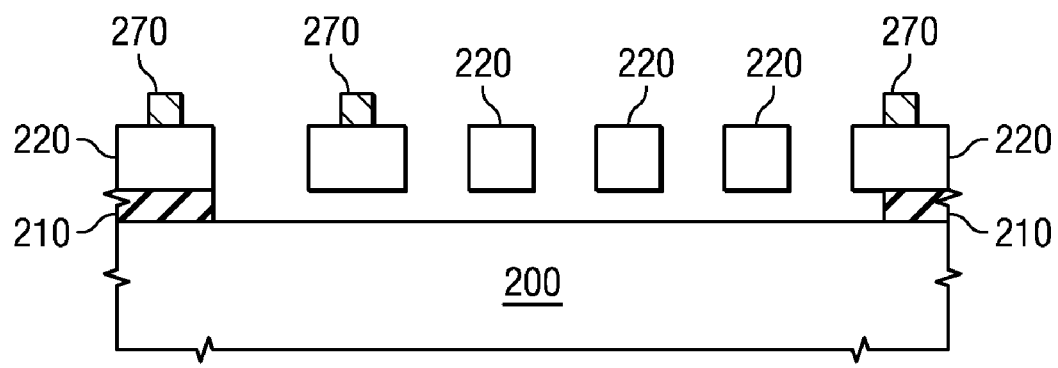

Turning now to FIG. 9I, a shadow mask 260 is used for the selective metallization 270 of the micromirrors and reflecting surfaces, as well as for creating connection pads. As shown in FIG. 9I, the shadow mask 260 is placed over the SOI substrate 200-220 to selectively sputter Cr/Au 270 onto desired portions of the top silicon layer 220. The projection lens required for the imaging applications could also be fabricated by the same technology if the imaging is in the IR range (in case of SOI technology as the Si is transparent in the IR). As shown in FIG. 9J, moving structures such as comb fingers, spring and moving mirror are released by etching the buried SiO2 layer 210 using HF, while fixed structures are not released due to the wider area of the SiO2 beneath.

In embodiments in which the Bosch process is used for DRIE etching (shown in FIG. 9E), rough mirror surfaces may result due to the periodic nature of the process. Thus, as shown in FIG. 9G, growing a thin oxide layer 250 on the surfaces and then removing it by HF, as shown in FIG. 9H, can be useful before structure release to ensure a smoother mirror surface. However, if a cryogenic DRIE process is used in FIG. 9E, the process steps shown in FIGS. 9G and 9H would be unnecessary since a smoother surface is obtained directly after etching. In addition, the aluminum mask shown in FIG. 9A may not be necessary, as the process tends to have better selectivity between a photo-resist material and silicon at cryogenic temperatures.

In the case of 2-D scanning or imaging, the same process flow shown in FIGS. 9A-9J may be used for the structure. However, in order to obtain a reflecting surface with an angle of 45 degrees with the substrate plane, anisotropic etching when the mask opening is properly oriented with respect to the crystalline plane of the wafer or time controlled anisotropic etching may be performed. In addition, the reflecting sphere (or in general the curved reflector) in 2-D scanning applications may be fabricated independently on a covering substrate as part of the packaging of the overall system.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. An optical microscanner, comprising:
   a moveable mirror optically coupled to receive an incident beam and operable to reflect the incident beam to produce a reflected beam;
   a Micro Electro-Mechanical System (MEMS) actuator coupled to the moveable mirror to cause a linear displacement of the moveable mirror; and
   a curved reflector operable to produce an angular rotation of the reflected beam based on the linear displacement of the moveable mirror.

2. The optical microscanner of claim 1, wherein the moveable mirror is the curved reflector and wherein the curved reflector is moveable in a linear motion to cause the incident beam to experience a different angle of incidence for each position of the curved reflector.

3. The optical microscanner of claim 1, wherein the curved reflector is optically coupled to receive the reflected beam reflected from the moveable mirror and operable to reflect the reflected beam to produce a second reflected beam.

4. The optical microscanner of claim 3, wherein the linear displacement of the moveable mirror produces a lateral displacement of the reflected beam incident on the curved reflector, and the curved reflector transforms the lateral displacement of the reflected beam into an angular rotation of the second reflected beam.

5. The optical microscanner of claim 1, further comprising:
   an optical source for directing the incident beam towards the moveable mirror, the linear displacement of the moveable mirror being perpendicular to a plane of the optical source.

6. The optical microscanner of claim 1, wherein the moveable mirror is fixed at an angle with respect to a plane of the incident beam.

7. The optical microscanner of claim 6, wherein the angle is 45 degrees.

8. The optical microscanner of claim 1, wherein the moveable mirror is one of a flat mirror or a curved mirror.

9. The optical microscanner of claim 1, wherein the curved reflector has one of a convex or a concave shape.

10. The optical microscanner of claim 1, wherein the optical microscanner is an imaging device, and wherein the incident beam includes light from an object to be imaged that is incident on the curved reflector, the curved reflector reflecting the incident beam towards the moveable mirror, and further comprising:
a detector optically coupled to receive the reflected beam from the moveable mirror and operable to measure a pixel of an image of the object, the linear displacement of the moveable mirror operating to project one pixel at a time onto the detector to produce a sequential data stream representing the image.

11. The optical microscanner of claim 10, further comprising:
an additional moveable mirror optically coupled to produce an additional reflected beam from an additional incident beam reflected from the curved reflector, the additional reflected beam being directed towards the detector to produce an additional sequential data stream representing a different portion of the image; and
an image processor for producing the image of the object based on the sequential data streams.

12. The optical microscanner of claim 11, further comprising:
an additional detector optically coupled to receive the additional reflected beam and operable to produce the additional sequential data stream corresponding to the different portion of the image.

13. The optical microscanner of claim 1, wherein the optical microscanner is a dispersive element spectrometer, and further comprising:
a diffraction grating optically coupled to receive the incident beam and diffract the incident beam to produce a plurality of incident beams directed towards different positions on the curved reflector, each of the plurality of incident beams having a different wavelength range; and
a detector optically coupled to receive the reflected beam corresponding to one of the plurality of incident beams from the moveable mirror, the linear displacement of the moveable mirror operating to reflect one of the plurality of incident beams at a time onto the detector to produce a sequential data stream.

14. The optical microscanner of claim 13, wherein the wavelength range for each of the plurality of incident beams includes a single different wavelength and the moveable mirror has a size substantially equivalent to a size of a slit in the diffraction grating.

15. The optical microscanner of claim 13, wherein the wavelength range for each of the plurality of incident beams includes multiple overlapping wavelengths, and further comprising:
a processor for calculating the intensity of each of the wavelengths using differentiation of the sequential data stream.

16. The optical microscanner of claim 15, further comprising:
an additional detector optically coupled to receive the plurality of incident beams reflected from the curved surface and operable to produce an additional complementary sequential data stream, the processor calculating the intensity of each of the wavelengths using differentiation of the sequential data stream and the additional complementary sequential data stream.

17. The optical microscanner of claim 1, wherein the optical scanner is a two-dimensional scanner, and wherein:
the moveable mirror includes a first moveable mirror moveable in a first plane and a second moveable mirror moveable in a second plane orthogonal to the first plane;
the first moveable mirror is optically coupled to receive the incident beam and operable to reflect the incident beam towards the second moveable mirror to produce a first reflected beam;
the second moveable mirror is optically coupled to receive the first reflected beam and operable to reflect the first reflected beam towards the curved reflector to produce a second reflected beam; and
the curved reflector is optically coupled to receive the second reflected beam and operable to reflect the second reflected beam to produce a third reflected beam having an angular displacement in the first and second planes produced as a result of the respective linear displacements of the first and second moveable mirrors.

18. The optical microscanner of claim 1, wherein the optical scanner is a two-dimensional imaging device, and wherein:
the moveable mirror includes a first moveable mirror moveable in a first plane and a second moveable mirror moveable in a second plane orthogonal to the first plane;
the curved reflector is optically coupled to receive the incident beam and operable to reflect the incident beam towards the first moveable mirror to produce a first reflected beam;
the first moveable mirror is optically coupled to receive the first reflected beam and operable to reflect the first reflected beam towards the second moveable mirror to produce a second reflected beam;
the second moveable mirror is optically coupled to receive the second reflected beam and operable to reflect the second reflected beam to produce a third reflected beam; and further comprising:
a detector optically coupled to receive the third reflected beam from the second moveable mirror and operable to measure a pixel of a two-dimensional image corresponding to the third reflected beam, the linear displacement of the first and second moveable mirrors operating to project one pixel at a time in two dimensions onto the detector to produce a sequential data stream representing the two-dimensional image.

19. The optical microscanner of claim 1, wherein the curved reflector and the moving mirror are aligned and fabricated in a single lithography step.

20. A method for fabricating an optical microscanner, comprising:
providing a silicon on insulator (SOI) wafer including a top surface and a bottom surface;
photolithographically defining within the top surface of the SOI wafer a moveable mirror optically coupled to receive an incident beam and operable to reflect the incident beam to produce a reflected beam, a Micro Electro-Mechanical System (MEMS) actuator coupled to the moveable mirror to cause a linear displacement of the moveable mirror and a curved reflector operable to produce an angular rotation of the reflected beam based on the linear displacement of the moveable mirror; and
etching between the top surface of the SOI wafer and the bottom surface of the SOI wafer to release the moveable mirror and the actuator.

* * * * *